UNITED STATES PATENT OFFICE.

JULIUS MÖGENBURG, OF LEVERKUSEN, NEAR COLOGNE, GERMANY, ASSIGNOR TO FARBENFABRIKEN VORM. FRIEDR. BAYER & CO., OF ELBERFELD, GERMANY, A CORPORATION OF GERMANY.

PROCESS OF MAKING 1-8-DIAMINONAPHTHALENE-4-SULFONIC ACID.

953,049. Specification of Letters Patent. Patented Mar. 29, 1910.

No Drawing. Application filed August 26, 1909. Serial No. 514,817.

*To all whom it may concern:*

Be it known that I, JULIUS MÖGENBURG, doctor of philosophy, chemist, citizen of the German Empire, residing at Leverkusen, near Cologne, Germany, have invented new and useful Improvements in New Processes for Producing 1-8-Diaminonaphthalene-4-Sulfonic Acid, of which the following is a specification.

My invention relates to a new and valuable process for producing the 1.8-diaminonaphthalene-4-sulfonic acid.

This new process consists in submitting the acid sulfate of 1.8-naphthylenediamin to the so-called "baking process" that is to say in heating in a suitable apparatus (preferably *in vacuo*) at temperatures above 100° C. the acid sulfate or mixtures of this naphthylenediamin with sulfuric acid capable of forming the acid sulfate.

In order to illustrate the new process more fully the following example is given, the parts being by weight: 158 parts of 1.8-diaminonaphthalene are added to a mixture which is being stirred of 255 parts of a 96 per cent. sulfuric acid with 110 parts of water and the stirring is continued until the pulpy mass which is formed has changed into crumbs. These are then heated on plates *in vacuo* at about 155° C. for about 10 hours. The product is then dissolved in a dilute sodium carbonate solution and insoluble impurities are removed by filtration. On acidulating the filtrate the 1.8-naphthylenediamin-4-sulfonic acid separates in the shape of glistening flakes.

I claim:—

1. The process for producing 1.8-diaminonaphthalene-4-sulfonic acid, which process consists in heating the acid sulfate of 1.8-naphthylenediamin to temperatures above 100° C., substantially as described.

2. The process for producing 1.8-diaminonaphthalene-4-sulfonic acid, which process consists in heating a mixture of 1.8-naphthylenediamin and sulfuric acid capable of forming the acid sulfate to temperatures above 100° C., substantially as described.

In testimony whereof I have hereunto set my hand in the presence of two subscribing witnesses.

JULIUS MÖGENBURG. [L. S.]

Witnesses:
 OTTO KÖNIG,
 WILLY KLEIN.